United States Patent [19]

Sakai et al.

[11] Patent Number: 4,716,731
[45] Date of Patent: Jan. 5, 1988

[54] ACTUATOR OF SHAPE MEMORY EFFECT MATERIAL

[75] Inventors: Toshikazu Sakai, Kawasaki; Makoto Higomura, Yokohama, both of Japan

[73] Assignee: Canon Kabushiki Kaisha, Tokyo, Japan

[21] Appl. No.: 895,698

[22] Filed: Aug. 12, 1986

[30] Foreign Application Priority Data

Aug. 16, 1985 [JP] Japan ................................. 60-179263

[51] Int. Cl.[4] ............................................... F03G 7/06
[52] U.S. Cl. ........................................ 60/527; 60/528; 337/139
[58] Field of Search ......................... 60/527, 528, 529; 148/402; 337/140, 139; 251/11; 236/101 R, 101 B

[56] References Cited

U.S. PATENT DOCUMENTS 4,553,393 11/1985 Ruoff ................................. 60/527

Primary Examiner—Stephen F. Husar
Attorney, Agent, or Firm—Fitzpatrick, Cella, Harper & Scinto

[57] ABSTRACT

An actuator made of a material having a shape memory effect includes a plurality of materials having a shape memory effect and a heat insulator member. The plurality of materials having a shape memory effect are disposed with the heat insulator member interposed therebetween, and the plurality of materials and the insulator member are joined together.

16 Claims, 5 Drawing Figures

| LENGTH Δℓox | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| UNIT(S) TO BE HEATED | $U_0$ | $U_1$ | $U_0$ $U_1$ | $U_2$ | $U_0$ $U_2$ | $U_1$ $U_2$ | $U_0$ $U_1$ $U_2$ | $U_3$ | $U_0$ $U_3$ | $U_1$ $U_3$ | $U_2$ $U_3$ | $U_0$ $U_1$ $U_3$ | $U_0$ $U_2$ $U_3$ | $U_1$ $U_2$ $U_3$ | $U_0$ $U_1$ $U_2$ $U_3$ |

ACTUATOR OF SHAPE MEMORY EFFECT MATERIAL

FIELD OF THE INVENTION

The present invention relates to an actuator of a shape memory effect material.

BACKGROUND OF THE INVENTION

Shape memory alloys such as Ti-Ni (titanium-nickel) alloy and Cu-Zn-Al (copper-zinc-aluminium) alloy have specific nature that if the deformed alloy is heated greater than a certain temperature (phase transfer temperature), the alloy takes the original shape previously memorized. In other words, the shape memory alloy constitutes a temperature sensor and has a heat-energy/mechanical-energy conversion function.

Paying attention to such function, a study is being made, e.g., on an actuator for robot arms requiring positional precision, wherein a shape memory alloy worked in the form of a rod or tape is used as the actuator and a drive force therefor is obtained by controlling the expansion and contraction of the actuator while heating and cooling. In a conventional shape memory alloy actuator of this type, the ends of the alloy material of a rod or tape shape are coupled to a driven member through a biasing spring having a preset tension. The alloy material is then rapidly heated or cooled by heating means or cooling means. The heating means is generally of a resistor heating type wherein Joule heat is used, the heat being generaged while an electric current flows in the alloy. As the cooling means, there is known a forced air cooling whereby the shape memory alloy wire is always subject to an air flow. However, with the this forced air cooling, the cooled air becomes a load during heating so that there is a limit of deformation response time. To obviate this limit, there have been studied many methods, e.g., a method wherein forced air cooling is effected only during cooling and it is stopped during heating, a method using water cooling instead of forced air cooling, and so on.

Despite the above, the actuator system using a shape memory alloy has an ample possibility of achieving substantially miniaturizing and eight-weighting the system and simplifying the mechanism, as compared with a conventional general actuator system constructed of a combination of temperature sensors, control units, motors and the like.

However, in the conventional shape memory alloy actuator, the shape memory alloy wire or tape itself constituting the actuator has been made of a shape memory alloy of a single continuous form. Thus, the following problems exist:

(a) The wire length of an actuator is detected by a sensor at all times to control the outputs of the heating and cooling means based on a feedback signal from the sensor. The need of such a closed loop control makes the system control complicated.

(b) The response property of the system control is poor (particularly, a low response speed during cooling), and it takes a time for the shape memory alloy actuator to be changed in a certain form.

(c) Since the response property varies depending upon which portion of the shape memory alloy is to be subjected to air flow from a heating source or a cooling source, or which portion is to be contacted with the heat source or the cooling source, control precision becomes bad.

SUMMARY OF THE INVENTION

An object of the present invention is to eliminate the above-described problems.

Another object of the present invention is to provide an actuator capable of controlling the full length of the actuator with a simple structure that a plurality of shape memory alloys are integrally joined together with heat insulator members interposed therebetween.

A further object of the present invention is to provide an actuator having a plurality of shape memory alloys integrally joined together and capable of operating a load coupled to the integrally joined shape memory alloys to take a desired operating state.

A still further object of the present invention is to provide an actuator having a plurality of shape memory alloys integrally joined together and capable of changing the full length of the actuator by controlling the temperature of each of the integrally joined shape memory alloys.

The other objects of the present invention will become apparent from the following description in conjunction with the accompanying drawings, and from the appended claims.

DETAILED DESCRIPTION OF THE PREFERRED EMBODIMENTS

Figure 1:
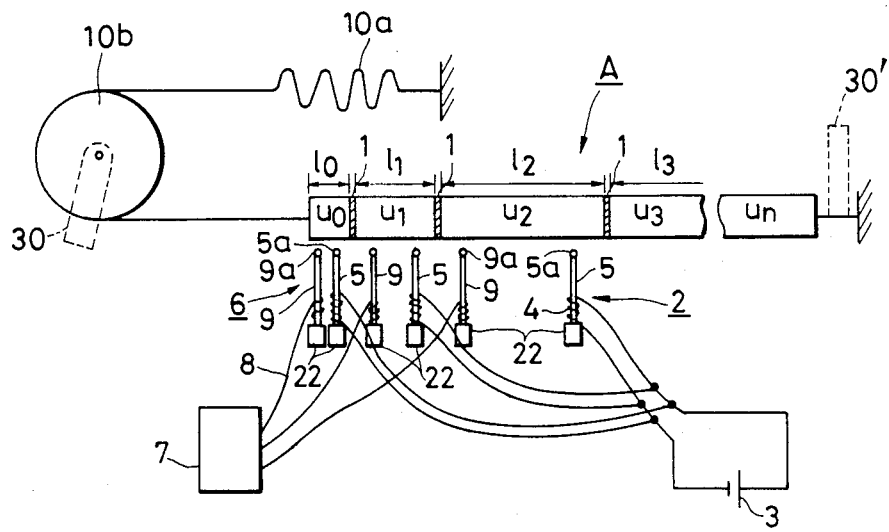
FIG. 1 shows the construction of an actuator using shape memory alloys according to one embodiment of the present invention.

The embodiments of the present invention will be described in connection with the accompanying drawings. FIG. 1 shows the construction of the actuator according to an embodiment of the present invention. In the figure, heat insulator members 1 constitute a part of the actuator A of a robot arm 30 or 30' for example. Units $U_0$, $U_1$, $U_2$, $U_3$, ..., $U_n$ of the actuator A are joined together with the heat insulator members 1 interposed therebetween by means of adhesive agent or the like. The units are made by cutting, for example, a Ti-Ni shape memory alloy of an uniform rod shape. The rod shape alloy has previously been memory-processed such that the length of the unit contracts to a certain length when it is heated. The lengths of respective units, $l_0, l_1, l_2, l_3, \ldots l_n$, are set as:

$$l_0:l_1:l_2:l_3:\ldots :l_n = 1:2:4:8:\ldots :2^n,$$

(n is positive integer) where $l_0$ is a reference length and equals the length of the unit $U_0$ having the smallest length, and the units are disposed in the order of a geometrical series having a common ratio 2. A heating member 2 is constructed of a power source 3, a heating coil 4 powered by the power source 3, and a heating body 5 made of a heating pipe about which the heating coil 4 is wound. A cooling member 6 is constructed of a cooling source 7 containing, for example, liquid nitrogen, heat conductor 8 of a good conductive nature whose one end contacts the cooling source 7, and a cooling body 9 made of a heating pipe intimately contacting the other end of the heat conductor 8. A contact device 22 is a device for contacting the heating pipes of the heating body 5 and the cooling body 9 with the shape memory alloy A.

Respective pairs of the heating body 5 and the cooling body 9 are disposed at the corresponding units $U_0$, $U_1$, $U_2$, $U_3$, ..., $U_n$ such that the former can contact the latter or separate from the latter. Reference 10a represents a biasing spring, and 10b represents a pulley serving as a coupler for bending the robot arm. The coupler may be used for articulations other than the arm.

Figure 2:
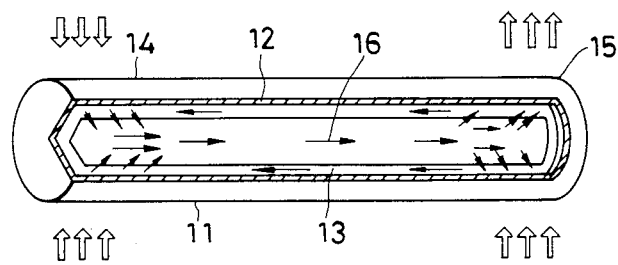
FIG. 2 shows the construction of the heating member and the cooling member.

FIG. 2 schematically shows the operating principle of the heating pipe constituting the heating body 5 and the cooling body 9. In the figure, a vacuum sealing container 11 is made of copper, iron, aluminum or the like. A liquid recirculating wick 12 is constructed of grooves, metal net or the like mounted within the container 11. Reference numeral 13 represents a heating medium sealed in the container 11, 14 represents an evaporation section serving as a heat input section, and 15 represents a condensation section serving as a heat output section. The heating member 13 receives latent heat at the evaporation section 14 and is vaporized to be transferred as a vaporized flow 16 to the condensation section 15 where the flow 16 emanates the latent heat to become liquidized, and the liquid returns via the wick 12 to the evaporation section 14 by means of capillarly phenomenon. The above procedure is repeatedly performed. The heat conduction quantity is determined by the flow of the heating medium and the latent heat irrespective of the distance.

Figure 3:
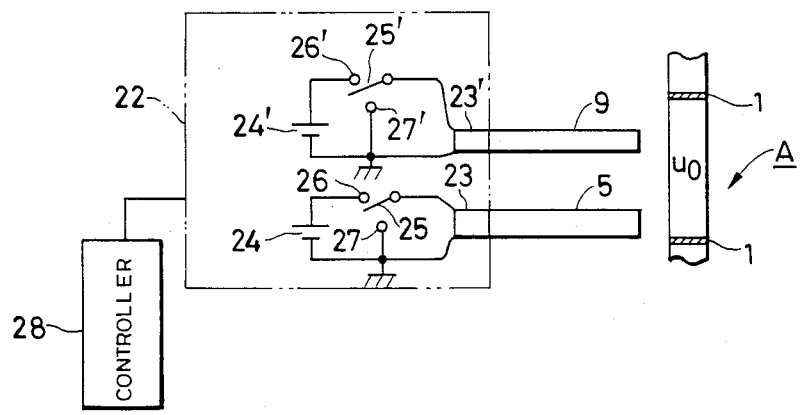
FIG. 3 shows the construction of the contact device.

FIG. 3 shows the construction of a contact device 22 for contacting the heating pipes of the heating body 5 and the cooling body 9 with the shape memory alloy A. Piezoelectric elements 23 and 23' are made of, for example, piezoresistance element. The piezoelectric elements 23 and 24 are powered with the respective power sources 24 and 24'. Switches 25 and 25' control to turn on or off the power supply to the piezoelectric elements 23 and 23' in response to an instruction from a controller 28. The piezoelectric element 23 is jointed at one end thereof to the heating body 5 by means of adhesive agent or the like, while the piezoelectric element 23' is joined to the cooling body 9. When the switch 25 is closed to a contact 26 side, the piezoelectric element 23 generates distortion due to the reverse piezoelectric effect, to thereby make the heating body 5 contact the shape memory alloy A. When the switch 25 is closed to a contact 27 side, the heating body 5 becomes separated from the shape memory alloy A. Similarly, when the switch 25' is closed to a contact 26' side, the cooling body 9 contacts the shape memory alloy A, while when the switch 25' is closed to a contact 27' side, the cooling body 9 becomes separated from the shape memory alloy A. The contact device 22 is provided for each of the heating bodies 5 and the cooling bodies 9 so that any desired heating or cooling body 5 or 9 may be made contacted or separated relative to the shape memory alloy A in response to an instruction from the controller 28.

The contact device may take other various constructions. For instance, a contact device which moves the heating body 5 and the cooling body 9 by means of magnetic field may be used. Next, the operation of the actuator thus constructed will be described.

The power source 3 of the heating member 2 is turned on to ppwer the heating coil 4 before the operation of the actuator. The heating medium 13 sealed in the heating pipe constituting the heating body 5 is vaporized by the heat generated by the heating coil 4. The vaporized heating medium as the vaporized flow 16 reaches the condensation section 15 at the end of the heating pipe where it is condensed and liquidized. Due to the heat of condensation at that time, the head portion 5a of the heating body 5 is always heated at a high temperature. The liquidized heating medium 13 is recirculated via the wick 12 to the evaporation section 14 where it again receives the heat of vaporization to accordingly become vaporized and repeat the circulation.

If the heating body head portion 5a heated at a high temperature as above is made contact with a certain unit of the actuator A, for example, the unit $U_0$, by means of the contact device 22, the temperature of the shape memory alloy rises. As a result, the temperature of the unit $U_0$ having a length $l_0$ reaches above its phase tranfer temperature so that the unit contracts to the previously memorized length by the amount of $\Delta l$. Therefore, the pulley 10b rotates against the tension of the biasing spring 10a to operate the robot arm. The shape (e.g., a bending shape) memorized previously as desired in the alloy will be restored. The heat conduction efficiency of the heating body 5 constructed of the heating pipe is very high and a great quantity of heat can be transferred in a short time from the heating body 5 to the unit $U_0$ of the actuator A, thereby enabling almost instantaneous deformation. The heat produced in the unit $U_0$ is not transferred to the adjacent units due to the presence of the heat insulator members 1, so that a precise control of the deformation $\Delta l_0$ of the actuator A is possible.

Figures 4, 5:
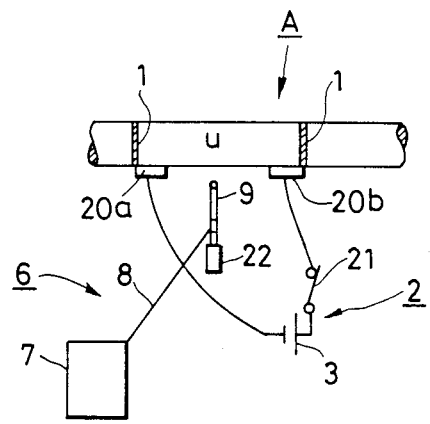
FIG. 4 shows the relationship between the actuator unit(s) and the length of the deformed actuator.
FIG. 5 shows the construction of an actuator according to another embodiment of the present invention.

The deformation quantity of the unit $U_1$ becomes $4\Delta l_0$ because the length $l_2$ of the unit $U_2$ is $4l_0$. Therefore, if the deformation amount of 4 times $\Delta l_0$ is desired, the heating body 5 is made contact with the unit $U_2$. If the deformation quantity of 4 times $\Delta l_0$ is desired, the heating bodies are made contact with the units $U_0$ and $U_2$. Similarly, with the actuator having 4 units $U_0$, $U_1$, $U_2$ and $U_3$, the control over the deformation quantity of 1 to 15 times $\Delta l_0$ may selectively be performed at a proper combination of the units as shown in FIG. 4. In case that the deformed robot arm is desired to have an original shape, the cooling body 9 of the cooling member 6 is made contact to the appropriate unit of the actuator A by operating the contact device 22. The heat of the unit is transferred to the heating medium 13 of the heating pipe via the cooling body head portion 9a. The transferred heat is converted into the heat of vaporization of the heating medium 13 so that the unit is rapidly cooled and expanded. Therefore, the pulley 10b is rotated in the reverse direction by the restoration force of the biasing spring 10a to thereby retain the original shape of the robot arm. The vaporized heating medium is conveyed to the condensation section 15 at the opposite side of the heating pipe, where a large quantity of heat is emitted and the vaporized heating medium is condensed and liquidized. The liquidized heating medium is again returned via the wick 12 to the evaporation section 14 at the head portion 9a side. The heat of condensation is removed by the heat conductor 8 cooled by the cooling source such as liquid nitrogen.

As seen from the above description, it is possible to control the expansion and contraction of the shape memory alloy actuator A as desired by selectively contacting or separating the heating body and the cooling body 9 relative to the proper unit $U_0$ to $U_n$. For instance, it is possible to directly control the movement of the driven unit of the position determining mechanism such as a robot arm or an X-Y table.

FIG. 5 shows the construction of the actuator according to another embodiment of the present invention.

This embodiment differs from the first embodiment in that heating the unit $U_0$ to $U_n$ of the actuator A is effected by means of a resistor heating method. In particular, there are provided electrodes $20a$ and $20b$ mounted on opposite ends of the unit $U_n$, and a switch 21 for opening and closing the circuit between the electrodes and the power source. By powering the unit between the two electrodes $20a$ and $20b$ upon closing the switch 21, the unit is self-heated. Such heating member is of course provided for each unit. It is possible to control the deformation quantity of the shape memory alloy actuator A as desired similarly to the first embodiment, by opening and closing the appropriate switch or switches 21 of the corresponding units. With the conventional resistor heating method using a pulse width modulation, a complicated close loop control has been necessary for precisely controlling the movement of the robot arm for example, the complicated close loop control including such as feedback controlling the pulse width modulation by way of the servo mechanism. However, with this embodiment, a very simple open loop control is possible in which merely switches are selectively turned on and off.

The heating member and the cooling member for the unit $U_0$ to $U_n$ constituting the shape memory alloy actuator A are not limited to the above embodiment, but other members may be applied. For example, a cooling member cooling the unit by a local blow of an air stream, a cooling member using a cold water pipe and the like are also possible.

The shape memory alloy of the above embodiments are of a so-called uni-directional type that the shape memory effect appears only during heating. Thus, to restore the shape at the low temperature, the shape memory alloy actuator is reversibly operated using the biasing spring (auxiliary spring) and the like. The present invention is not limited to the shape memory alloy of such type, but a so-called dual-directional type may be applied. Further, a so-called omni-directional type shape memory alloy may be applied whose deformation direction includes not only the one-dimensional direction but also the two- and three-dimensional directions.

In case where the dual-directional type shape memory alloy is used, the actuator can be operated only through the digital actuation of the heating and cooling members without using other auxiliary members. Thus, the whole system of the actuator can be further simplified.

Furthermore, the actuator of the present invention can be applied not only to the robot arm described in the above embodiments, but also to the position determining mechanism for an X-Y table, and other apparatuses.

Although the respective lengths of the units are determined so as to satisfy the geometrical series of a common ratio 2 in the above embodiments, other common ratios may be used. Or the units may be disposed such that they become longer by a constant length in the order of the disposal. Also, the use of the units having different deformation quantity may lead to the same advantageous effects of the present invention.

The present invention is not intended to be limited to the above embodiments, since various alterations are possible within the scope of the appended claims.

What we claim is:

1. An actuator, comprising:
   a plurality of materials having a shape memory effect;
   a heat insulator member; and
   heating means for providing said plurality of materials with heat, wherein said plurality of materials having a shape memory effect disposed with said heat insulator member interposed therebetween, and said plurality of materials and said insulator member are joined together.

2. An actuator according to claim 1, wherein said plurality of materials having a shape memory effect includes a material having a shape memory effect and a different deformation quantity.

3. An actuator according to claim 1, wherein said plurality of mateirals having a shape memory effect each have a different deformation quantity.

4. An actuator according to claim 1, wherein said heating means also comprises means for cooling said plurality of materials.

5. An actuator, comprising:
   a plurality of materials having a shape memory effect, said materials being serially joined together;
   means for independently controlling the temperature of said plurality of materials; and
   means for changing the length of said joined plurality of materials by controlling the temperature of at least one of said plurality of materials by means of said temperature controlling means.

6. An actuator according to claim 5, wherein said temperature control means includes heating means and cooling means.

7. An actuator according to claim 5, wherein said plurality of materials having a shape memory effect each have a different deformation quantity.

8. An actuator according to claim 7, wherein the ratio in length between the respective ones of said plurality of materials is set to form a predetermined series.

9. An actuator according to claim 5, wherein said changing means changes the total length of said joined materials into a desired length by operating said temperature controlling means once.

10. An actuator, comprising:
    a plurality of materials having a shape memory effect, said materials being serially joined together;
    means for independently controlling the temperature of said plurality of materials;
    a driven unit coupled to said serially joined plurality of materials; and
    means for driving said driven unit by controlling the temperature of at least one of said plurality of materials by means of said temperature controlling means.

11. An actuator according to claim 10, wherein said temperature control means includes heating means and cooling means.

12. An actuator according to claim 10, wherein said plurality of materials having a shape memory effect each have a different deformation quantity.

13. An actuator according to claim 12, wherein the ratio in length between the respective ones of said plurality of materials is so set to form a predetermined series.

14. An actuator according to claim 10, wherein said driving means drives said driven unit by a desired distance by operating said temperature controlling means once.

15. An actuator using a material having a shape memory effect comprising:
a joined member which is constructed by joining together units of a predetermined length and interposing an insulator member therebetween, said units having been separated from a material of a uniform composition having a shape memory effect and having been memorized with a predetermined shape;
means for independently controlling the temperature of said units; and
means for changing the full length of said joined member by controlling the temperature of at least one of said units.

16. An actuator according to claim 15, wherein the ratio in length between the respective ones of said units is so set to form a predetermined series.

* * * * *

UNITED STATES PATENT AND TRADEMARK OFFICE
CERTIFICATE OF CORRECTION

PATENT NO. : 4,716,731
DATED : January 5, 1988
INVENTOR(S) : TOSHIKAZU SAKAI, ET AL.

It is certified that error appears in the above-identified patent and that said Letters Patent is hereby corrected as shown below:

COLUMN 1

Line 32, "generaged" should read --generated--.
    Line 36, "this" should be deleted.
    Line 45, "and eight-weighting" should be deleted.

COLUMN 2

Line 52, "an" should read --a--.

COLUMN 3

Line 40, "24" should read --23'--.
    Line 44, "jointed" should read --joined--.

COLUMN 4

Line 2, "ppwer" should read --power--.
    Line 20, "tranfer" should read --transfer--.
    Line 38, "U2." should read --$U_2$.--.

UNITED STATES PATENT AND TRADEMARK OFFICE
CERTIFICATE OF CORRECTION

PATENT NO. : 4,716,731
DATED : January 5, 1988
INVENTOR(S) : TOSHIKAZU SAKAI, ET AL.

It is certified that error appears in the above-identified patent and that said Letters Patent is hereby corrected as shown below:

COLUMN 6

Line 19, "mateirals" should read --materials--.

Signed and Sealed this

Nineteenth Day of July, 1988

Attest:

DONALD J. QUIGG

Attesting Officer

Commissioner of Patents and Trademarks